3,002,988
CHLOROSILANE PURIFICATION
Richard A. Falk, Midland, Mich., assignor to Dow Corning Corporation, Midland, Mich., a corporation of Michigan
No Drawing. Filed Oct. 16, 1958, Ser. No. 767,513
2 Claims. (Cl. 260—448.2)

This invention relates to a method of separating diorganodichlorosilanes and triorganochlorosilanes from polyfunctional chlorosilanes, i.e. chlorosilanes containing from 3 to 4 total chlorine and silicon-bonded hydrogen atoms per silicon, in a silane mixture by oxidizing the silicon-bonded hydrogen, esterifying the polyfunctional silanes with glacial orthophosphoric acid and distilling off the diorganodichlorosilanes and triorganochlorosilanes.

The preparation of the best possible silicone rubbers makes necessary the use of essentially linear polymeric gums, that is gums made up of molecules which contain almost exclusively diorganosiloxane units. The presence of triorganosiloxy units, monoorganosiloxy and $SiO_2$ units are all detrimental to the formation of the desired long chain polymeric gums. Triorganosiloxy units in such gums act as polymer endblockers and necessarily limit the average number of siloxane units in any polymer thereby limiting the possible ultimate plasticity of the gum. Monoorganosiloxy and $SiO_2$ units in such gums act as cross-linking agents producing two detrimental effects. First, where polymer chains are linked together, the effective length of any chain in the ultimate rubber is limited to the distance between cross-links. Second, the more cross-linking which is present, the higher the plasticity of the gum. These two effects combine to form the illusion of false body in a gum whereas subsequent working of the gum shows that it actually has a low degree of polymerization, i.e. a low number of diorganosiloxane units, between cross-links. It is desirable, therefore, to be able to reduce the number of triorganosiloxy, monoorganosiloxy and $SiO_2$ units in the polymerization system.

One method of doing this is simply fractional distillation of the corresponding chlorosilanes. Fractionation techniques have been developed which in some cases can reduce the amount of each of the mono-, tri- and tetrachlorosilanes to fractions of a percent, sometimes below 0.1%. However, even this percentage is too high for the tri- and tetrachlorosilanes.

One of the objects of this invention is to further reduce the fractional percentages of tri- and tetrachlorosilanes present in the essentially diorganodichlorosilanes isolated during fractionation.

Another problem involved in the preparation of linear polymers is the presence of silicon-bonded hydrogen. Silicon-bonded hydrogen while inactive in a mixture of chlorosilanes is unstable in polymerization systems such as those involving hydrolysis and condensation in the presence of an alkaline catalyst. Consequently, in the polymerization system any silicon-bonded hydrogen will provide the same functionality as the silicon-bonded chlorine atoms of the chlorosilanes. This means, for instance, that a monoorganomonohydrogendichlorosilane, while apparently only difunctional, becomes trifunctional during polymerization and causes the same harmful effects as monoorganotrichlorosilane. While fractionation of the chlorosilanes generally removes all but a fractional percentage of chlorosilanes containing the undesirable silicon-bonded hydrogen, there can still be a high enough percentage of such silanes to have the same adverse effects on gums and rubbers as the monoorganotrichlorosilanes and tetrachlorosilanes discussed previously.

Therefore, another object of this invention is to provide a method of eliminating silicon-bonded hydrogen from a chlorosilane mixture. These objects as well as others which will become apparent are accomplished by this invention.

This invention relates to a method for separating triorganomonochlorosilane and diorganodichlorosilane from a chlorosilane mixture containing primarily diorganodichlorosilane which comprises contacting the chlorosilane mixture with both an oxidizing agent and glacial orthophosphoric acid and distilling off the triorganomonochlorosilane and diorganodichlorosilane.

The chlorosilane mixtures with which the method of this invention is effective are mixtures of chlorosilanes of the formula $R_nH_mSiCl_{4-n-m}$, in which each R is a monovalent hydrocarbon radical or halogenated hydrocarbon radical and $m$, $n$ and the sum of $m$ and $n$ each range in value from 0 to 3. More specifically the chlorosilane mixtures can contain silanes having such configurations as $RSiCl_3$, $R_2SiCl_2$, $R_3SiCl$, $SiCl_4$, $HSiCl_3$, $H_2SiCl_2$, $H_3SiCl$, $RHSiCl_2$, $R_2HSiCl$ and $RH_2SiCl$.

As stated above each R can be a monovalent hydrocarbon radical or halogenated monovalent hydrocarbon radical. More specifically R can be, for example, any alkyl radical such as the methyl, ethyl, isopropyl, tert-butyl, 2-ethylhexyl, dodecyl and octadecyl radicals; any alkenyl radical such as the vinyl, allyl and hexadienyl radicals; any cycloalkyl radical such as the cyclopentyl and cyclohexyl radicals; any cycloalkenyl radical such as the cyclopentenyl and cyclohexenyl radicals; any aryl radical such as the phenyl, naphthyl and xenyl radicals; any aralkyl radical such as the benzyl, phenylethyl and xylyl radicals and any alkaryl radical such as the tolyl and dimethylphenyl radicals. These monovalent hydrocarbon radicals can be halogenated to give such radicals as the chloromethyl, 3,3,3-trifluoropropyl, perchlorophenyl, 2,3-dibromocyclohexyl, $\alpha,\alpha,\alpha$-trifluorotolyl, 2,4-dibromobenzyl, trifluoromonochlorovinyl, $\alpha,\beta,\beta$-trifluoro-$\alpha$-chlorocyclobutyl and 2-iodocyclopenten-3-yl radicals, all of which are operative.

Thus, specific examples of organochlorosilanes which can be present in various chlorosilane mixtures include dimethyldichlorosilane, benzylhydrogendichlorosilane, bis-3,3,3 - trifluoropropyldichlorosilane, phenylmethylvinylchlorosilane, octadecyltrichlorosilane, perchlorophenylcyclopentylhydrogenchlorosilane, cyclopentenyldihydrogenchlorosilane and 2-ethylhexyldivinylchlorosilane. As a practical matter the chlorosilane mixtures will contain primarily no more than two species of organic radicals plus extraneous amounts of other radicals formed during the production of the chlorosilane mixture. For example, in the direct process for preparing dimethyldichlorosilane the resulting mixture contains not only $MeSiCl_3$, $Me_2SiCl_2$, $Me_3SiCl$ and $SiCl_4$ but can contain such materials as, for example, $HSiCl_3$, $H_2SiCl_2$, $H_3SiCl$, $MeHSiCl_2$, $Me_2HSiCl$, $MeH_2SiCl$, $EtHSiCl_2$ and $EtSiCl_3$, all of which can remain in minute amounts even after fractionation to isolate the $Me_2SiCl_2$. Likewise in the preparation and isolation by fractionation of $PhMeSiCl_2$, the product contains minute amounts of various phenyl and methyl silanes with and without silicon-bonded hydrogen as well as silanes containing new radicals formed by cracking of the radicals originally introduced. Ph stands for the phenyl radical and Me stands for the methyl radical.

The chlorosilane mixtures described above are contacted with an oxidizing agent to remove the silicon-bonded hydrogen. To be effective the oxidizing agent must be sufficiently dispersible, preferably soluble, in the chlorosilane mixture to make possible adequate contact assuring reaction with essentially all silicon-bonded hydrogen atoms in the mixture. The oxidizing agent must not attack the organic radicals on silicon or attack the carbon-silicon bonds in the silane mixture. Oxidizing agents which have been found to be most effective have been chromyl chloride, permanganyl chloride and mercuric chloride. When the method of this invention is employed using one of these preferred catalysts under optimum conditions, there are no detectable silicon-bonded hydrogen atoms remaining in the chlorosilane mixture. Concentrated sulfuric acid, silver oxide and mercuric oxide are also operative.

It is necessary that at least one equivalent of oxidizing agent be present per equivalent of silicon-bonded hydrogen. The hydrogen atoms are replaced by chlorine atoms in the formation of more highly chlorinated silanes which can be subsequently esterified or oxygen atoms in the formation of siloxanes boiling at temperatures sufficiently higher than the boiling point of the diorgano-dichlorosilane being purified to make possible simple and complete separation by fractionation. Generally at least a mol to mol ratio, preferably a two-fold excess, of oxidizing agent is employed for ease of separation and to insure as much as possible the complete removal of silicon-bonded hydrogen. However, the reaction rate is also affected by temperature of the system and the time allowed. For an unknown system containing a known amount of silicon-bonded hydrogen it is only necessary to add an excess of oxidizing agent and gradually heat the mixture, to reflux if necessary, taking samples and checking the silicon-bonded hydrogen content until satisfactory removal is achieved. It is possible that heating above normal reflux temperature by putting the system under pressure might be necessary, but such a contingency would not change the principle nor the effectiveness of the method of this invention.

While chromyl chloride, permanganyl chloride and mercuric chloride are preferred, the first two need not be added as such. They can be generated in situ by adding to the chlorosilane mixture such materials as chromic oxide, potassium dichromate, manganese heptoxide or potassium permanganate.

The chlorosilane mixtures are also contacted with glacial orthophosphoric acid. This inorganic acid forms high boiling esters with all the chlorosilanes, but preferentially esterifies tri- and tetrachlorosilanes. The "esterification" involved is the reaction:

$$\equiv SiCl + HOP\equiv \longrightarrow \equiv SiOP\equiv + HCl$$

The apparent selectivity of this acid makes possible the esterification of small amounts of tri- and tetrachlorosilanes in a mixtures containing mostly a diorganodichlorosilane with a comparatively small loss of dichlorosilane by esterification. At least one mol of acid per mol of both tri- and tetrachlorosilane is necessary but preferably at least a ten-fold excess of acid should be used and preferably over a 30-fold excess. However, as the excess of acid increases the loss of dichlorosilane is greater in conformity to the law of mass action. The amount of acid necessary can be reduced by increasing the time for reaction and heating the system. All the esterification products are soluble in the chlorosilane mixture, but the ester boiling points are sufficiently high that the unreacted diorganodichlorosilane can be easily distilled off.

There is no criticality in the order of addition of the oxidizing agent and the orthophosphoric acid to the chlorosilane mixture. They can be added individually or together. They can be added in a solvent system or a solvent-free system. The preferred method is adding them together in a solvent-free system, then refluxing the mixture until the desired reactions are sufficiently complete and then stripping off the diorganodichlorosilane. Any triorganochlorosilane in the original mixture will come off with the diorganodichlorosilane product which is, however, essentially free of tri- and tetrafunctional chlorosilanes. The method of this invention can be operated continuously or batch-wise depending solely on the preference of the user.

As a practical matter the method of this invention is preferably employed only with the chlorosilane mixtures containing less than 0.5 mol percent silicon-bonded hydrogen and less than 0.2 mol percent total tri- and tetrachlorosilanes. Where these limits are exceeded, the yield of the diorganodichlorosilane is reduced severely due to the consequent necessity of large amounts of reagents and the subsequent formation of a high percentage of non-distillable by-products. However, the method is operative with higher molar concentrations of these units. Since fractionation in production units can generally reduce both these concentrations to 0.1 mol percent or less, the instant method offers an economical way of obtaining pure diorganodichlorosilanes.

Where no silicon-bonded hydrogen is detectable in a chlorosilane mixture, it is only necessary to add the glacial orthophosphoric acid to the mixture, allow the reaction to take place and distill.

Where tri- or tetrachlorosilanes are necessarily present as in a resin system, silicon-bonded hydrogen can be removed by using the oxidizing agent alone, and both the oxidizing agent residue and the chlorosiloxane by-products can be just left in the system. However, in a system where pure diorganodichlorosilane is desired, it is recommended that following or during oxidation of any silicon-bonded hydrogen the system be treated to esterify any polyfunctional silanes which might be produced during the oxidation.

The method of this invention is useful in that it provides a means easily adaptable to commercial scale for purifying diorganodichlorosilanes employed in the production of high polymer linear gums by specific steps for eliminating simultaneously or separately silicon-bonded hydrogen and tri- and tetrachlorosilanes from any chlorosilane mixture.

The following examples are merely illustrative of the simplicity and effectiveness of the method of this invention and are not intended to limit the invention which is properly delineated in the claims.

*Example 1*

The chlorosilane mixture employed in this example contained 0.15 percent by weight methyltrichlorosilane, 0.01 percent by weight tetrachlorosilane, 0.15 percent by weight ethylhydrogendichlorosilane, 0.03 percent by weight trimethylchlorosilane and 99.66 percent by weight dimethyldichlorosilane. 3921.0 grams of this mixture were stirred for 16 hours at room temperature with 380 grams of glacial orthophosphoric acid and 21.4 grams of chromyl chloride. The mixture was then strip-distilled to give a 70% yield of dimethyldichlorosilane free of polyfunctional silanes, i.e. methyltrichlorosilane, tetrachlorosilane and ethylhydrogendichlorosilane. This product was hydrolyzed in ice water. 70 grams of the hydrolyzate were mixed with 0.0186 gram of $$NaOSiMe_2OSiMe_2ONa$$

catalyst and heated at 150° C. for 24 hours. The resulting linear gum had a Williams plasticity of 0.063 inch. Similar hydrolysis and alkali polymerization of the unpurified mixture produced a gel.

*Example 2*

549.0 grams of the silane mixture employed in Example 1 were stirred for 64 hours at room temperature with 27.27 grams of glacial orthophosphoric acid and 0.95 gram of potassium permanganate. The mixture was then strip-distilled to give an 80.6% yield of dimethyldichlorosilane free of polyfunctional silanes. This product was hydrolyzed in a cold alkaline system. 25 grams of the hydrolyzate were mixed with 0.0078 gram of  KOSiMe$_2$OSiMe$_2$OK catalyst and heated at 150° C. for 24 hours to produce a high molecular weight linear gum.

*Example 3*

546.7 grams of the silane mixture employed in Example 1 were stirred for 16 hours at room temperature with 1.0 gram of potassium dichromate and distilled to produce an 86.4% yield of the mixture free of detectable silicon-bonded hydrogen. 367.7 grams of this mixture was mixed with 20 grams of glacial orthophosphoric acid and distilled to produce an 89% yield of dimethyldichlorosilane free of polyfunctional silanes. This product was hydrolyzed in cold water. 48 grams of the hydrolyzate were heated with 0.0157 gram of $KOSiMe_2OSiMe_2OK$ catalyst at 150° C. for 24 hours to produce a high molecular weight linear gum.

Example 4

4000 grams of the silane mixture employed in Example 1 were stirred for 24 hours at room temperature with 201.4 grams of glacial orthophosphoric acid after which a two-fold excess of $HgCl_2$ calculated on the amount of ethylhydrogendichlorosilane present was added. The resulting mixture was distilled at atmospheric pressure to give an 80% yield of dimethyldichlorosilane free of polyfunctional silanes. This product was hydrolyzed and polymerized in the manner shown in Example 1 to produce a high molecular weight linear gum.

When either silver oxide or mercuric oxide are substituted for the mercuric chloride above and the system is refluxed for several hours, similar results are obtained.

Example 5

455.0 grams of the silane mixture employed in Example 1 were stirred for 20 hours at room temperature with 44.0 grams of glacial orthophosphoric acid and 20.8 grams of concentrated sulfuric acid, and dimethyldichlorosilane free of polyfunctional silanes was distilled off. This product was hydrolyzed in an ice water-toluene system. 11.2 grams of the hydrolyzate were polymerized at 150° C. for 24 hours in the presence of .0063 gram of $NaOSiMe_2OSiMe_2ONa$ catalyst to produce a high molecular weight linear gum.

Example 6

1025 grams of the silane mixture employed in Example 1 were stirred for 16 hours at room temperature with 96.2 grams of glacial orthophosphoric acid followed by refluxing for 8 hours with 4.5 grams of chromic oxide. The mixture was distilled to produce dimethyldichlorosilane free of polyfunctional silanes as shown by the fact that hydrolysis and polymerization in the manner shown in Example 1 produced a high molecular weight linear gum.

Example 7

540 grams of a 99.85% pure vinylmethyldichlorosilane containing some polyfunctional silanes including primarily vinyltrichlorosilane and trace amounts of methylhydrogendichlorosilane were stirred with 60 grams of glacial orthophosphoric acid at room temperature for 16 hours followed by refluxing for 24 hours after which the system was allowed to cool. 1.714 grams of mercuric chloride were then added to the mixture which was heated to distill off a 68% yield of vinylmethyldichlorosilane free of polyfunctional silanes. This was hydrolyzed in a $Na_2CO_3$-ice water-toluene system and the hydrolyzate polymerized at 40° C. and 1 mm. Hg absolute pressure in the presence of $NaOSiMe_2OSiMe_2ONa$ to form a high molecular weight linear gum.

When a sample of the original mixture was hydrolyzed and condensed under similar conditions, the system gelled.

Example 8

465.1 grams of a 99.90+% pure ethylmethyldichlorosilane containing as impurities mainly $C_2H_5SiCl_3$ and silanes containing silicon-bonded hydrogen were mixed at room temperature for 20 hours with 31.2 grams of glacial orthophosphoric acid and 1 gram of chromyl chloride. Upon distillation of the mixture a 76.5% yield of ethylmethyldichlorosilane free of polyfunctional silanes was obtained. This product was hydrolyzed in an ice water-ether system. 57 grams of the hydrolyzate were polymerized at 150° C. in the presence of 0.0157 gram of $Me_3SiOK$ to a low molecular weight gum having a viscosity of approximately 400,000 cs. at 25° C.

When a sample of the original mixture was hydrolyzed and condensed under similar conditions, the system gelled.

Example 9

2554 grams of a phenylmethyldichlorosilane containing approximately 1.0% $PhMeSiHCl$ and 0.4% $PhSiCl_3$ were mixed at room temperature for 16 hours with 165.5 grams of glacial orthophosphoric acid after which 12.0 grams of chromyl chloride were added. Distillation yielded a 90% yield of phenylmethyldichlorosilane free of polyfunctional silanes. A part of this product was hydrolyzed, and the hydrolyzate was condensed by standard alkaline polymerization procedure to a high molecular weight linear gum.

The unpurified silane when hydrolyzed and condensed by the same polymerization procedure produced a fluidous cross-linked polymer.

Example 10

When a 99.87% pure chloromethylcyclopentyldichlorosilane containing 0.11% total $SiCl_4(CH_2)_5SiCl_3$ and $ClCH_2SiCl_3$ and 0.02% silanes containing silicon-bonded hydrogen is treated according to the method of Example 1, pure chloromethylcyclopentyldichlorosilane is produced. This pure silane can be converted by standard hydrolysis and condensation procedures to a high molecular weight linear gum whereas the unpurified silane employed in the same procedures forms a gel.

Example 11

When a 99.90% perchlorophenylmethyldichlorosilane containing 0.05% total $C_6Cl_5SiCl_3$, $MeSiCl_3$ and $SiCl_4$ and 0.05% total $C_6Cl_5SiHCl_2$ and $MeSiHCl_2$ is treated according to the method of Example 9, pure perchlorophenylmethyldichlorosilane is produced.

That which is claimed is:

1. A method comprising contacting a mixture of silanes of the formula $R_nH_mSiCl_{4-m-n}$, in which each R is independently selected from the group consisting of monovalent hydrocarbon radicals and halogenated monovalent hydrocarbon radicals and $m$ and $n$ and the sum of $m$ and $n$ have a value ranging from 0 to 3, said mixture containing primarily diorganodichlorosilanes and containing some polyfunctional silanes selected from the group consisting of monoorgano-substituted silanes and silanes free of organic substitution, with (1) at least one equivalent per equivalent of silicon-bonded hydrogen of an oxidizing agent selected from the group consisting of permanganyl chloride, chromyl chloride and mercuric chloride for a time and at a temperature sufficient to replace all of the detectable silicon-bonded hydrogen in the system with silicon-bonded chlorine and (2) glacial orthophosphoric acid in an amount equal to at least one mol of acid per mol of the aforesaid polyfunctional silanes for a time and at a temperature sufficient to esterify all of said polyfunctional silanes and distilling diorganodichlorosilanes and any triorganomonochlorosilanes from the esterification products.

2. A method comprising contacting a mixture of silanes of the formula $R_nSiCl_{4-n}$, in which each R is independently selected from the group consisting of monovalent hydrocarbon radicals and halogenated monovalent hydrocarbon radicals and $n$ has a value ranging from 0 to 3, said mixture containing primarily diorganodichlorosilanes and containing some polyfunctional silanes selected from the group consisting of monoorgano-substituted silanes and silanes free of organic substitution, with glacial orthophosphoric acid in an amount equal to one mol of acid per mol of said polyfunctional silanes for a time and at a temperature sufficient to esterify all of said polyfunctional silanes and distilling diorganodichlorosilanes and any triorganomonochlorosilanes from the esterification products.

(References on following page)

References Cited in the file of this patent

UNITED STATES PATENTS

| | | |
|---|---|---|
| 2,435,147 | McGregor et al. | Jan. 27, 1948 |
| 2,488,449 | Trautman | Nov. 15, 1949 |

FOREIGN PATENTS

| | | |
|---|---|---|
| 606,301 | Great Britain | Aug. 11, 1948 |

OTHER REFERENCES

Hackh's Chem. Dictionary, 3d ed. (1946), The Blakiston Co., Philadelphia, Pa., publishers, page 200.

Eaborn: Jour. Chem. Soc., London, 1950, pp. 3077–89 (page 3086 relied on).

Fritz: Zeitschrift fur Anorganische & Allgemeine Chemie, vol. 280, pp. 134–42 (1955).

Anderson: Jour. Am. Chem. Soc., vol. 80, pp. 5083–5, Oct. 5, 1958.

Anderson et al.: Jour. Am. Chem. Soc., vol. 81, pp. 1027–8 (1959).

Germany (Kl. 12.0.26.03), M16354, Oct. 13, 1955.